United States Patent [19]
Matsuda

[11] Patent Number: 5,790,908
[45] Date of Patent: Aug. 4, 1998

[54] DIOPTER CONTROL APPARATUS IN A ZOOM CAMERA

[75] Inventor: Norimichi Matsuda, Tokyo, Japan

[73] Assignee: Asahi Kogaku Kogyo Kabushiki Kaisha, Tokyo, Japan

[21] Appl. No.: 972,058

[22] Filed: Nov. 17, 1997

Related U.S. Application Data

[63] Continuation of Ser. No. 595,283, Feb. 1, 1996, abandoned.

[30] Foreign Application Priority Data

Feb. 6, 1995 [JP] Japan ................... 7-018278

[51] Int. Cl.⁶ ............................................... G03B 13/10
[52] U.S. Cl. .................................... 396/379; 396/38
[58] Field of Search .......................... 396/378, 379, 396/382

[56] References Cited

U.S. PATENT DOCUMENTS

| | | | |
|---|---|---|---|
| 5,036,346 | 7/1991 | Hatamori et al. | 354/195.12 |
| 5,258,798 | 11/1993 | Iida et al. | 354/400 |
| 5,266,992 | 11/1993 | Takaoka et al. | 354/199 |
| 5,321,454 | 6/1994 | Mogamiya | 354/195.12 |
| 5,325,140 | 6/1994 | Torikoshi et al. | 354/159 |
| 5,335,035 | 8/1994 | Maeda | 354/219 |
| 5,345,287 | 9/1994 | Taguchi | |
| 5,424,793 | 6/1995 | Fukushima et al. | 354/199 |
| 5,448,400 | 9/1995 | Kikuchi et al. | 359/422 |
| 5,576,779 | 11/1996 | Ikemori et al. | 396/79 |
| 5,678,093 | 10/1997 | Asakura et al. | 396/379 |
| 5,692,227 | 11/1997 | Yukota et al. | 396/377 |
| 5,708,886 | 1/1998 | Hayashi | 396/379 |

*Primary Examiner*—Safet Metjahic
*Assistant Examiner*—John Chizmar
*Attorney, Agent, or Firm*—Greenblum & Bernstein, P.L.C.

[57] ABSTRACT

A diopter control apparatus in a zoom camera having a variable finder optical system in which zooming is carried out by varying the distance between at least two lenses of the variable finder optical system. The diopter control apparatus includes a diopter correcting lens which constitutes a part of the variable finder optical system and which is supported for movement in the optical axis direction of the variable finder optical system. A motor is driven to move the lenses of the variable finder optical system in the optical axis direction in accordance with a switching operation to carry out zooming. A transmission mechanism transmits the rotation of the motor to the diopter correcting lens to move the latter in the optical axis direction, and a switching button selectively transmits the rotation of the transmission mechanism to an eyepiece which serves as the diopter correcting lens.

20 Claims, 7 Drawing Sheets

DIOPTER CONTROL APPARATUS IN A ZOOM CAMERA

This application is a continuation of application Ser. No. 08/595,283, filed Feb. 1, 1996, now abandoned.

BACKGROUND OF THE INVENTION

1. Field of the Invention

The present invention relates to a diopter control apparatus in a finder of a zoom camera.

2. Description of Related Art

A diopter control apparatus is known in which a diopter can be adjusted by a relative movement of an eyepiece (ocular) in the finder optical system, without using diopter correcting lenses having refractive powers corresponding to different diopters. The diopter adjustment refers to an adjustment of the divergence of light emitted from the eyepiece depending on the eyesight of a photographer, so that an image of an object located at a standard object distance and an image of a field frame (AF object distance measuring frame) can be formed on the photographer's retina.

In conventional diopter control (adjustment) apparatuses, an adjusting lever or dial is provided on an outer surface of a camera and is manually actuated by a photographer's finger to move an eyepiece to thereby adjust the diopter.

The adjusting lever or dial must be constructed so that it can not be accidentally or unintentionally actuated. Namely, once an adjustment has been made, the adjusting lever or dial must be immovably held, until such a time when a different photographer uses the camera. To this end in conventional diopter control apparatuses, the adjusting lever or dial is made small and is usually provided close to the finder to prevent a photographer, while taking a picture, from accidentally touching the adjusting lever or dial with his or her finger. Consequently, upon adjusting the diopter, the photographer must move his or her eye away from the finder after visually confirming the object image or the field frame (AF frame) through the finder. Hence, it is difficult for a photographer to adjust the diopter in the conventional diopter control apparatus.

In general, a zoom camera having a motor-driven zoom lens is provided with a zoom switch which is actuated to effect the zooming operation. This zoom switch is provided in a position at which it can be actuated by a finger of a hand holding the camera.

SUMMARY OF THE INVENTION

It is an object of the present invention to provide a diopter control apparatus in a zoom camera in which a diopter correcting lens can be moved in accordance with the operation of an existing zoom switch and the diopter adjustment can be easily carried out by a finger of a photographer's hand which holds the camera, i.e., a photographer can adjust the diopter without moving his or her eye away from the finder.

To achieve the object mentioned above, according to the present invention, a diopter control apparatus in a zoom camera has a variable finder optical system in which zooming is carried out by varying a distance between at least two lenses. The diopter control apparatus comprises a diopter correcting lens which constitutes a part of the variable finder optical system. This lens is supported for movement in the optical axis direction of the variable finder optical system through a motor in accordance with a switching operation to carry out the zooming operation. A transmission mechanism transmits the rotation of the motor to the diopter correcting lens to move the latter in the optical axis direction, through a switching mechanism in accordance with an external operation.

Preferably, a variable photographing optical system is provided whose focal length is varied in synchronization with the zooming of the variable finder optical system when a lens of the variable photographing optical system is moved in the optical axis direction by the motor. The variable finder optical system is preferably a real image type finder in which a real image of an object to be photographed is formed by an objective lens system.

The diopter control apparatus further comprises a cam plate which is provided with a cam to move the lens of the variable finder optical system in the optical axis direction. This cam plate is moved in a direction perpendicular to the optical axis by the motor.

Preferably, the transmission mechanism includes a lever which is rotatably supported by a pivot shaft and which is provided with a first arm extending adjacent to the surface of the cam plate and a second arm connected to the diopter correcting lens. A friction member is provided on the first arm. The switching mechanism moves the first arm away from or close to the cam plate to thereby selectively bring the friction member into contact with the cam plate. The switching mechanism includes comprises a shaft portion which depresses an arched portion provided on the first arm at a position away from the pivot shaft to elastically deform the first arm to thereby bring the friction member provided on the first arm into contact with the cam plate. The switching mechanism also comprises an operating portion which is connected to one end of the shaft portion and which is exposed outside the zoom camera.

The diopter control apparatus preferably further includes a restricting element for restricting the angular displacement of the lever when the transmission of the movement of the cam plate to the lever is broken by the switching mechanism.

Preferably, the diopter control apparatus includes a movable member which is moved in a direction perpendicular to the optical axis direction by the motor and a converting mechanism for transmitting the movement of the movable member to the diopter correcting lens to move the latter in the optical axis direction. The movable member is made of a plate whose longitudinal direction is identical to the direction of the movement thereof by the motor.

The zoom camera in the present invention includes any camera in which a photographing lens includes a variable photographing optical system, such as a silver halide film camera, an electronic still camera, a movie camera, or a video camera.

In these types of cameras, it is possible to drive the variable power lens of the power varying optical system (variable optical system) by a motor in the optical axis direction to vary the focal length thereof in synchronization with the variation of the magnification of the variable finder optical system.

The finder optical system can be a real image type finder or a virtual image type finder, such as, an inverted Galilean finder. In case of a real image type finder, a field frame is provided at an image forming position at which an object image is formed by an objective lens, to restrict an angle of view, or a focusing transparent plate is provided on which a frame is drawn. The frame can be realized by a frame which represents a photographing range or an AF object distance measuring frame which represents an autofocusing object distance zone.

The motor can be a motor having a rotor which rotates relative to a stator, such as, a servo motor, a DC motor, a pulse motor, etc., or an ultrasonic motor, or a linear motor in which a rotor is moved linearly. To carry out the zooming operation of the optical system by the motor, it is possible to use a cam or a gear. If a cam is used, the lens of the variable finder optical system is moved in the optical axis direction by the cam and is moved in the direction perpendicular to the optical axis by the motor.

The cam can be made of a flat plate or a cylindrical cam which surrounds the finder optical system. The cam profile of the cam plate is determined in accordance with the shape of a cam follower provided on each variable power lens of the finder optical system. For example, the cam profile can be defined by a bottomed groove (or grooves) formed on the surface of the cam plate, a hole (or holes) extending through the cam plate, a rib (or ribs) projecting from the surface of the cam plate, or an edge of the cam plate.

The transmission mechanism may include a gear train, a combination of a belt or chain and pulleys, or a linkage. If a linkage is used, a lever is associated therewith. Namely, the lever includes a first arm which extends towards the surface of the cam plate, and a second arm which is connected to the diopter correcting lens and is rotatably attached to a shaft. The rotation of the lever causes the diopter correcting lens to move in the optical axis direction. The first arm is provided on the surface thereof adjacent to the cam plate with a frictional member. The first arm is moved away from or towards the cam plate by a switching mechanism, so that the frictional member can be brought into contact with the cam plate or spaced from the cam plate. With this arrangement, when the frictional member is brought into contact with the cam plate by the switching mechanism, the movement of the cam plate causes the lever to rotate to thereby move the diopter correcting lens in the optical axis direction. When the frictional member is moved away from the cam plate by the switching mechanism movement of the cam plate is not transmitted to the lever, so that the movement of the diopter correcting lens is stopped.

The switching mechanism can be realized by a clutch provided at the front end, an intermediate portion, or the rear end of the transmission mechanism.

As mentioned above, the transmission mechanism includes a lever, the second arm of the lever is moved away from or towards the cam plate. To this end, the shaft to which the lever is rotatably attached is moved away from or towards the cam plate. Alternatively, it is also possible to press the second arm of the lever to deform or deflect the same to come away from or towards the cam plate without moving the shaft itself, whereby the frictional member provided at the front end of the second arm is brought into contact with the cam plate. Consequently, no movement of the first arm of the lever in the axial direction takes place when the switching mechanism is actuated, and hence, no disconnection of the lever and the diopter correcting lens occurs.

In the arrangement in which the second arm of the lever is deflected or deformed by the switching mechanism, it is possible to construct the switching mechanism in such a way that it is in contact with the second arm of the lever during the rotation of the lever. Alternatively, it is possible to provide, on the second arm of the lever, an arched integral portion whose center of arc is located on the axis of rotation of the lever. In this alternative, the width of the second arm of the lever can be reduced while ensuring that the second arm is always biased or pressed by the switching mechanism.

It is possible to provide a restricting mechanism for restricting the movement of the lever when the transmission of the movement of the cam plate to the lever is broken by the switching mechanism. Consequently, no accidental or unintentional movement of the eyepiece takes place when the switching mechanism is operated.

The present disclosure relates to subject matter contained in Japanese Patent Application No. 07-18278 (filed on Feb. 6, 1995) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

An aspect of the present invention will be discussed below. In this aspect, the diopter control apparatus is applied to an AF (autofocus) zoom compact camera (hereinafter referred to as a camera).

Structure of the Camera

Figure 2:
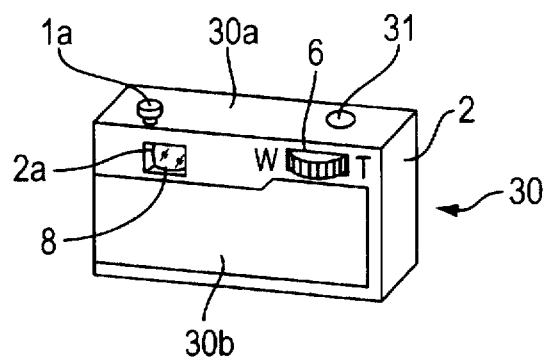
FIG. 2 is a rear view of a zoom camera.

FIG. 2 shows a perspective view of a camera 30 as viewed from behind. The camera 30 is a lens-shutter type, comprised of a photographing optical system 29 of variable power (FIG. 5), having a motor-driven zoom lens, and a real image type variable finder optical system having lenses L1, L2 and L3, whose optical axis is parallel with the optical axis of the variable photographing optical system 29.

In the camera 30, the main components, such as the variable photographing optical system 29 and the variable finder optical system, etc., are secured to a body frame (not shown). The body frame is covered by an industrial plastic cover 2 as shown in FIG. 2.

The upper surface 30a of the camera 30 (cover 2) is provided with a shutter release button 31 and a switching button 1. The switching button 1 is actuated to switch between a diopter adjustment position and an inoperative position in which no adjustment of the diopter is effected. A finder opening (finder window) 2a is formed on a rear surface 30b of the camera 30 (cover 2). An eyepiece 8 has a diopter correcting lens which forms a part of the variable finder optical system, facing the opening 2a in the camera 30. Consequently, a photographer can observe an object image formed by the variable photographing optical system (motor-driven zoom lens) through the opening 2a.

A zoom lever 6 is provided on the rear surface 30b of the camera 30. The zoom lever 6 is in the form of a dial and is rotatably supported by an upright shaft extending in the vertical direction of the camera 30 (not shown). The zoom lever 6 is associated with a switch 6a (FIG. 4) which is provided with switch elements 6aW and 6aT which are selectively connected according to the direction of rotation of the zoom lever 6. Upon zooming, when the zoom lever 6 is rotated in the direction W, the switch element 6aW is turned ON, so that the motor M drives the variable photographing optical system 29 and the variable finder optical system in the wide angle direction; and when the zoom lever 6 is rotated in the direction T, the switch element 6aT is turned ON, so that the motor M drives the variable photographing optical system 29 and the variable finder optical system in the telephoto direction.

Optical Arrangement of Variable Finder Optical System

Figure 3:
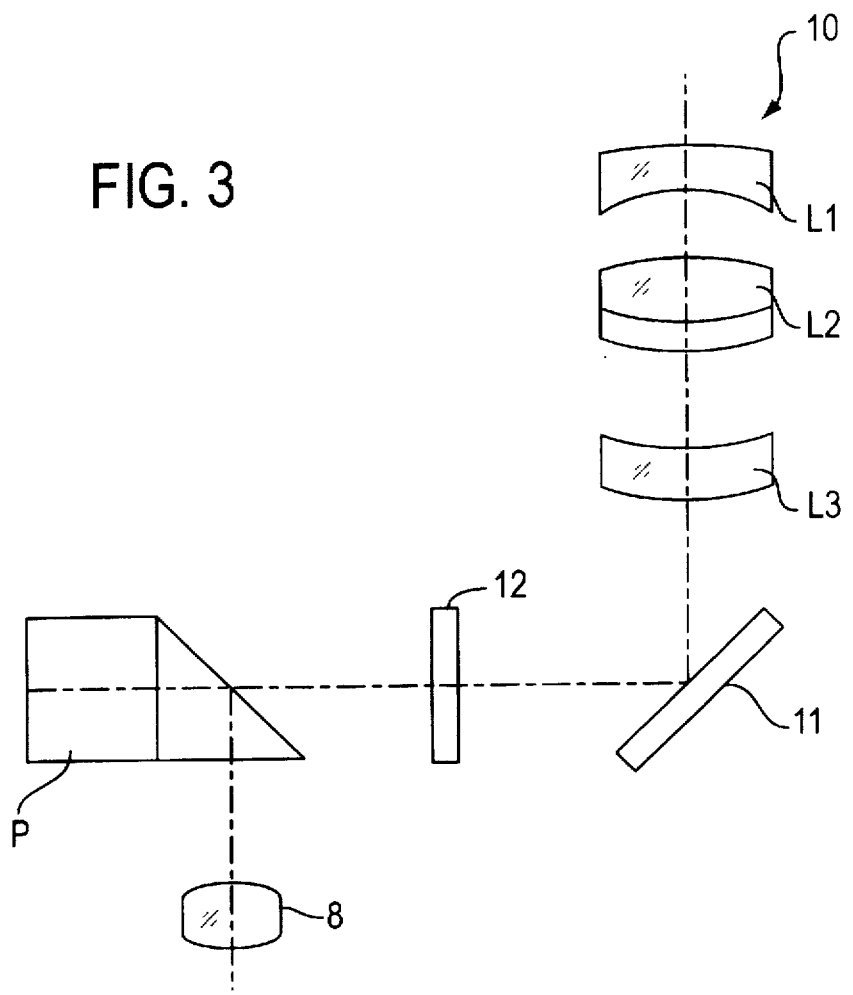
FIG. 3 is a schematic view of an optical arrangement of a variable finder optical system incorporated in the zoom camera shown in FIG. 2.

FIG. 3 shows an optical arrangement of the variable finder optical system incorporated in the camera 30. The variable finder optical system is essentially comprised of an objective optical system (objective lens) 10 which forms a real image of an object to be photographed, and the eyepiece 8 which magnifies the object image formed by the objective lens system 10. The objective lens system 10 and the eyepiece 8 are arranged in this order from the object side. The objective lens system 10 includes a stationary lens L1, and movable lenses L2 and L3 of variable power. The movable lenses L2 and L3 are moved in accordance with the zooming operation to vary the focal length of the whole objective lens system 10 without moving the object image in the optical axis direction.

A focusing plate 12, made of a glass plate, is disposed at an image forming position at which the object image, located at a standard object distance, is formed by the objective lens system 10. The focusing plate 12 is provided thereon with an AF object distance measuring frame F, formed by a vapor deposition of aluminum, and is adapted to meet the size of the object image with the frame F upon autofocusing.

A mirror 11 is secured to the camera body between the objective lens system 10 and the focusing plate 12 to deviate the optical path at right angles. Also, a Porro prism P is secured to the camera body, between the focusing plate 12 and the eyepiece 8. The Porro prism P erects the object image which has been formed on, or in the vicinity of, the focusing plate 12 in an inverted state, and deviates the optical path so as to be parallel with the optical axis of the objective lens system 10.

The eyepiece 8 is made of a molded transparent resin. The eyepiece 8 is located at a reference position (-1 diopter) in which an image of an object at a standard object distance and an image of the AF object distance measuring frame F are formed on a retina of a photographer having normal eyesight, so that the image is viewed as if it were located at a distance of 1 meter in front of the photographer.

When a photographer is farsighted, the eyepiece 8 is moved from the reference position toward the photographer. Consequently, the degree of divergence of the light emitted from the eyepiece 8 is reduced, and hence, the object image and the image of the frame F can be formed on the retina of the photographer. Conversely, when a photographer is nearsighted, the eyepiece 8 is moved away from the reference position toward the focusing plate 12. Consequently, the degree of divergence of the light emitted from the eyepiece 8 is increased, and hence, the object image and the image of the frame F can be formed on the retina of the photographer.

Zooming Mechanism of Variable Finder Optical System and Variable Photographing Optical System The zooming mechanism, i.e., that mechanism which varies the power (magnification) of the variable finder optical system in synchronization with the zooming operation (magnification control) of the variable photographing optical system will be discussed below.

Figure 1:
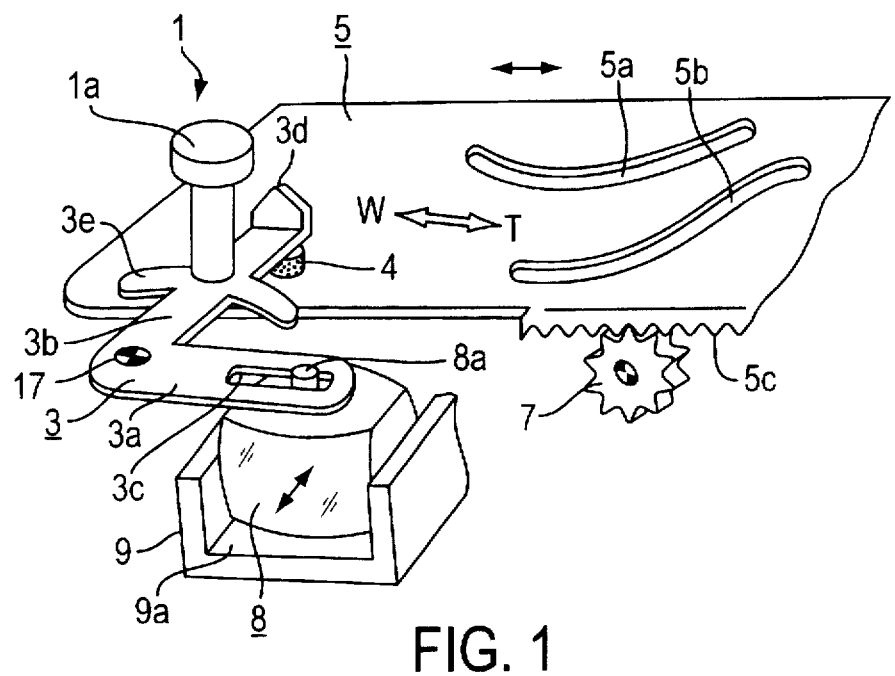
FIG. 1 is a perspective view of the main components of a diopter control apparatus in a zoom camera, according to an aspect of the present invention.
Figure 4:
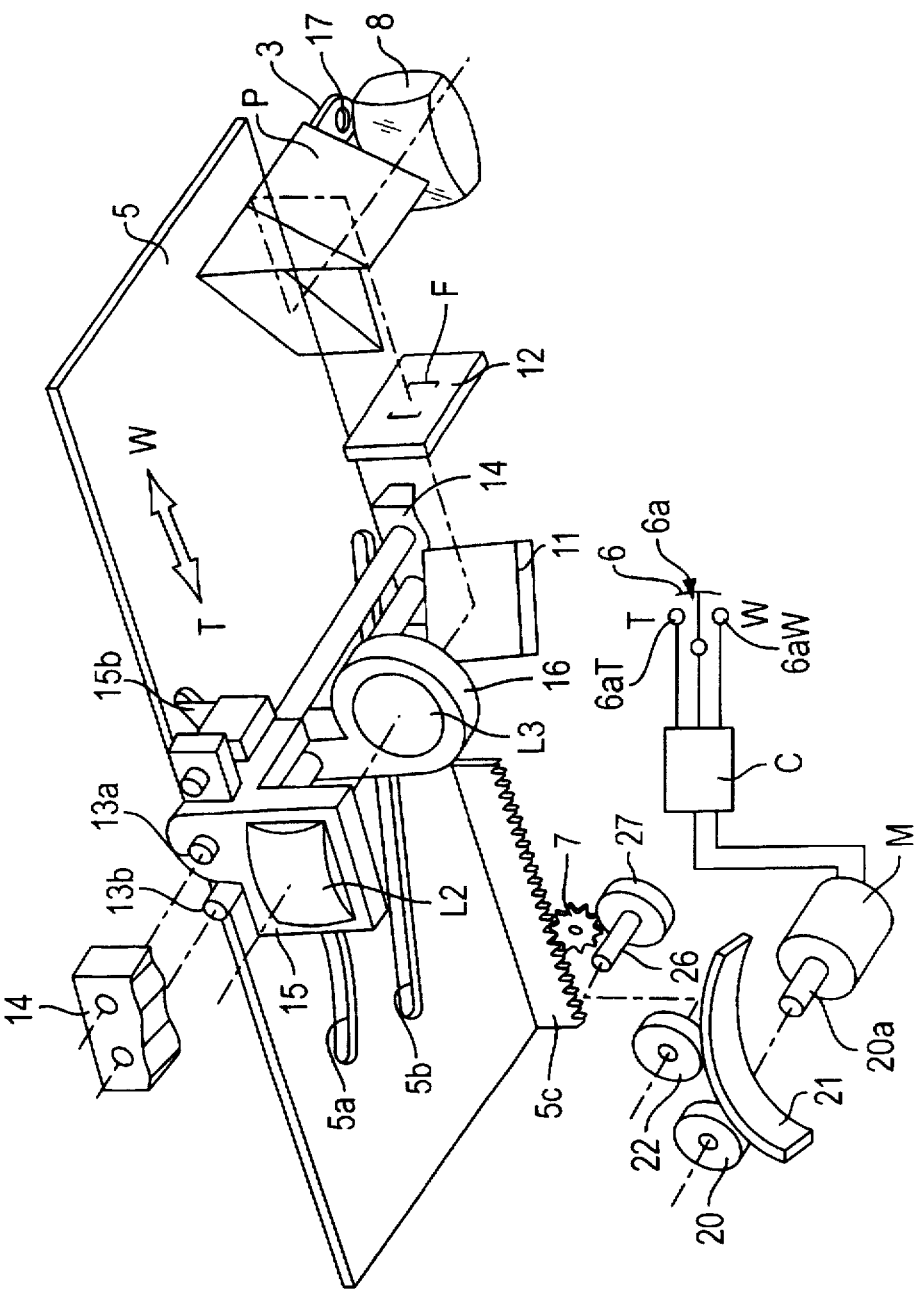
FIG. 4 is a perspective view of a zoom mechanism of the variable finder optical system shown in FIG. 3.
Figure 5:
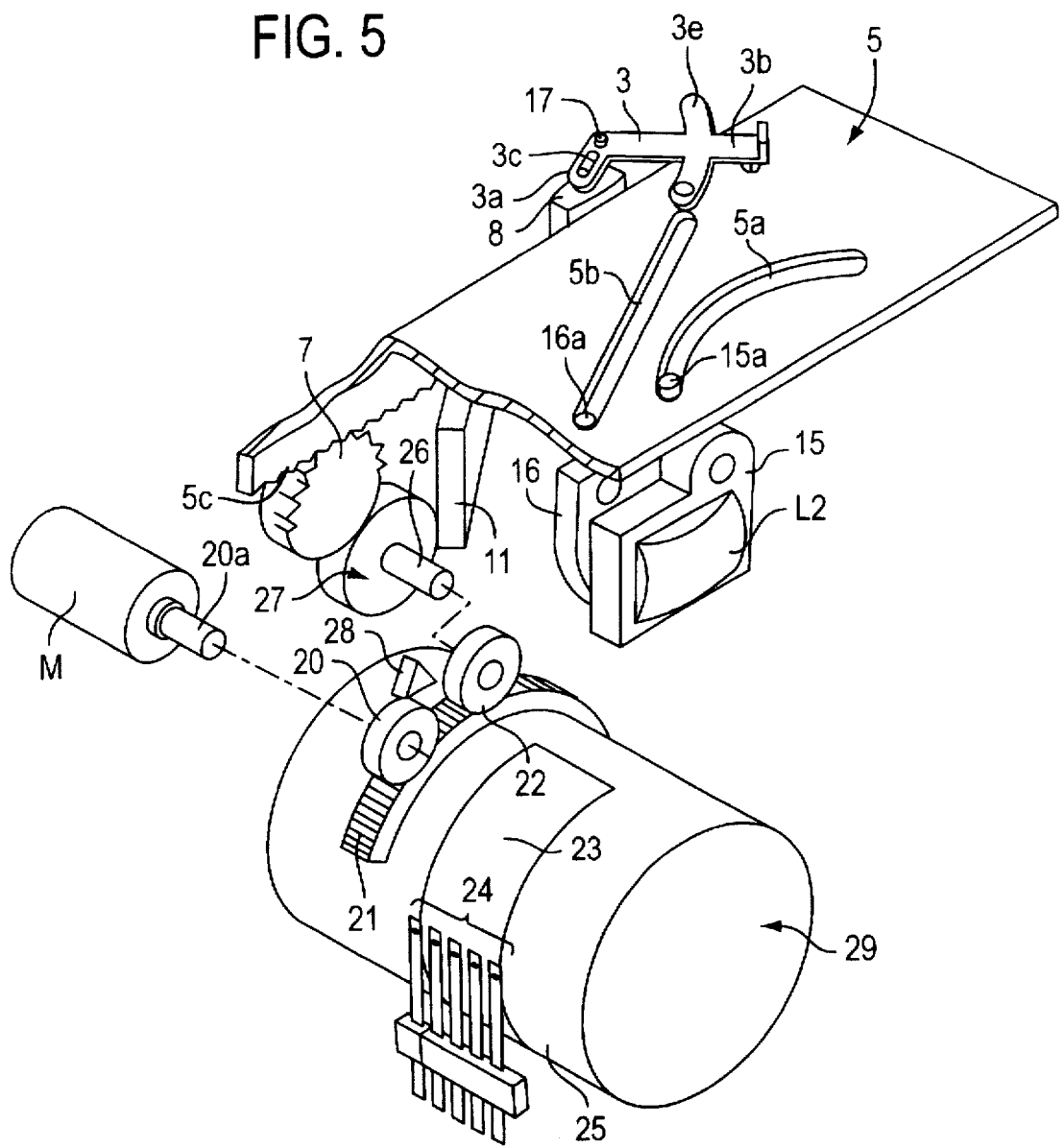
FIG. 5 is a perspective view of a lens barrel of a photographing optical system which is driven, upon zooming, by a gear shown in FIG. 4.

FIG. 1 shows a perspective view of the internal structure of the camera 30, viewed from the same direction as FIG. 2. FIG. 4 shows a perspective view of the internal structure of the camera 30, viewed in a direction opposite to FIG. 1. FIG. 5 is a perspective view of the internal structure of the camera 30, as viewed from a point above that shown in FIG. 4.

As can be seen from FIGS. 1 and 2, a rectangular cam plate 5 is provided between the upper surface 30a of the camera 30 and the variable finder optical system. The cam plate 5 is positioned so that the longitudinal direction thereof is parallel to the longitudinal direction of the camera 30. The cam plate 5 is slidable in the longitudinal direction in a plane parallel with the upper surface 30a of the camera 30. The cam plate 5 is provided on a longitudinal side surface thereof with a rack 5c which is in mesh with a pinion 7 which is driven by a motor M (FIG. 4), so that the cam plate 5 can be slidably driven by the motor M through the engagement of the rack 5c and the pinion 7. The mechanism for moving the cam plate 5 in association with the motor M will be explained below with reference to FIG. 5.

The motor M has a drive shaft 20a which is provided on the front end thereof with a pinion 20 secured thereto. The pinion 20 is in mesh with a sector gear (arched gear) 21 which is secured to the peripheral surface of a cam ring (cylindrical cam) 25 which is rotatably supported with respect to the body frame. The variable photographing optical system (zoom lens) 29 and the cam mechanism which moves it are incorporated in the cam ring 25. Consequently, when the motor M is rotated in accordance with the operation of the switch 6a, the cam ring 25 is rotated to vary the magnification (zoom) of the variable photographing optical system 29.

Note that in FIG. 5, the cam ring 25 is provided on an outer surface thereof with a code plate 23 which represents the current focal length of the variable photographing optical system 29. Data from the code plate 23 can be read by a brush 24 secured to the body frame. Numeral 28 designates a stop which restricts the angular displacement of the cam ring 25.

The sector gear 21 provided on the outer surface of the cam ring 25 is also engaged by another pinion 22 whose shaft 26 is provided on its rear end with a pinion 27 secured thereto. The pinion 27 is in mesh with the pinion 7 which is in turn in mesh with the rack 5c of the cam plate 5. Thus, when the motor M is rotated in accordance with the operation of the zoom lever 6, the cam plate 5 is moved in a direction perpendicular to the optical axis of the variable photographing optical system 29 in synchronization with the zooming operation of the variable photographing optical system 2.

The cam plate 5 is provided with a first cam groove 5a which defines a locus along which the movable lens L2 moves and a second cam groove 5b which defines a locus along which the movable lens L3 moves. The first and second cam grooves 5a and 5b extend through the thickness of the cam plate 5.

As can be seen in FIG. 4, the cam plate 5 is provided, on the lower surface thereof adjacent to the variable finder optical system, with side plates 14 which are in turn provided on the inner surfaces thereof with two parallel guide shafts, i.e., a first guide shaft 13a and a second guide shaft 13b which extend below the cam plate 5. Namely, the guide shafts 13a and 13b are secured at opposite ends thereof to the inner surfaces of the opposed side plates 14. The guide shafts 13a and 13b extend in parallel with the optical axis of the objective lens system 10 and are spaced from one another in the direction of the sliding movement of the cam plate 5.

A first lens frame 15 which holds the movable lens L2 is slidably attached to the first guide shaft 13a to linearly move along the same without rotating. Similarly, a second lens frame 16 which holds the movable lens L3 is slidably attached to the second guide shaft 13b to linearly move along the same without rotating. Thus, the movable lenses L2 and L3 are moved in the optical axis direction.

The first lens frame 15 is provided with a cam pin 15a which is fitted in the first cam groove 5a of the cam plate 5 (FIG. 5). Similarly, the second lens frame 16 is provided with a cam pin 16a which is fitted in the second cam groove 5b of the cam plate 5. Consequently, the movement of the movable lenses L2 and L3 is restricted by the profile of the cam grooves 5a and 5b, respectively. Namely, the movable lenses L2 and L3 are forcibly moved to positions determined by the sliding position of the cam plate 5, so as to vary the focal length of the whole objective lens system 10. Namely, when the cam plate 5 is slid, the variable photographing optical system and the variable finder optical system 10 are simultaneously zoomed while maintaining the same focal length.

Note that in FIG. 4, the motor M, the mirror 11, the focusing plate 12, and the Porro prism P are secured to the side plates (body frame) 14.

Diopter Adjusting Mechanism

The mechanism for adjusting the diopter by moving the eyepiece 8 in the optical axis direction will be discussed below.

As shown in FIG. 1, a guide (trough) 9 having a generally U-shaped channel 9a is integrally provided with the side plates 14 below the guide plate 5. The guide channel 9a extends in a direction perpendicular to the direction of the sliding movement of the cam plate 5.

The eyepiece 8 is guided by the guide channel 9a of the guide 9, which acts as an eyepiece holding means, to move in the optical axis direction. Namely, the outer surface of the eyepiece 8 is shaped to fit the sectional shape of the guide channel 9a of the guide 9 so that the eyepiece 8 can slice smoothly in the guide channel 9a, without any play. Thus, no deviation or decentering of the optical axis occurs due to play between the eyepiece 8 and the guide member 9. The eyepiece 8 is provided, on the upper surface thereof adjacent to the cam plate 5, with a pin 8a integral therewith, which constitutes a part of the transmission mechanism.

Figure 6:
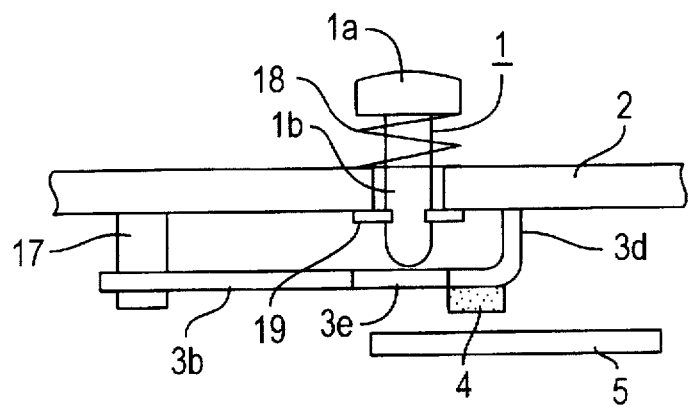
FIG. 6 is a perspective view of a switching button and its surroundings when the switching button is in an inoperative position.

The lever 3 of the transmission mechanism is made of a metal or a resilient member, such as synthetic resin. The lever 3 is provided with a short arm (second arm) 3a and a long arm (first arm) 3b which is connected to the short arm 3a at right angles. The short arm 3a is provided with an elongated hole 3c which extends in the longitudinal direction thereof, so that the pin 8a of the eyepiece 8 is fitted in the elongated hole 3c. A shaft 17 pivotally mounts the lever 3 at the connection between the first and second arms 3b and 3a, and is secured to the inner surface of the cover 2 so that the lever 3 is rotatable about the axis of the pivot shaft 17 with respect to the cover 2 and the guide 9 integral therewith (FIG. 6). The angular displacement of the lever 3 is restricted by the movement of the pin 8a within the elongated hole 3c.

Figure 8:
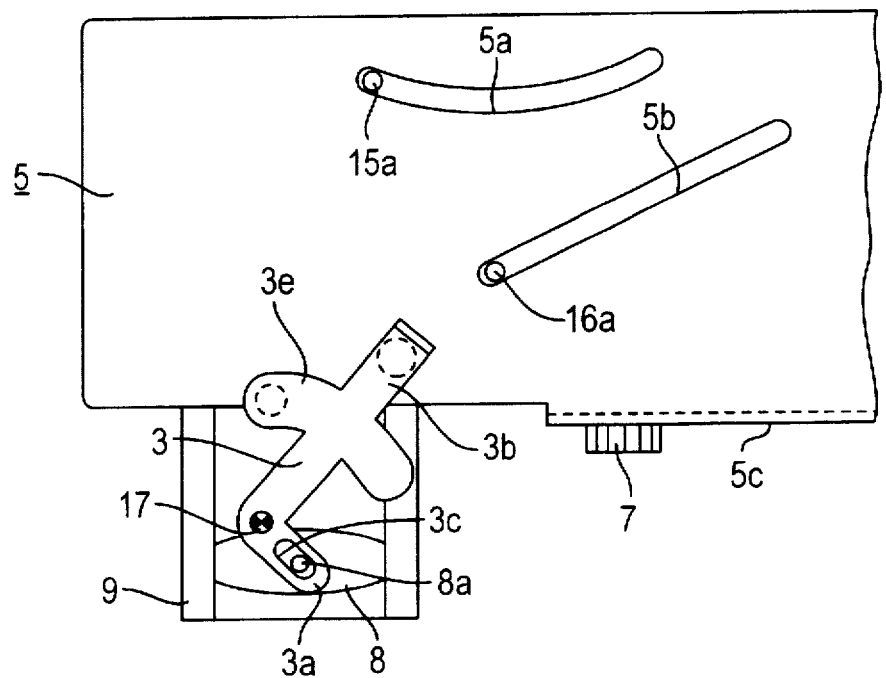
FIG. 8 is a plan view of the main components of a diopter control apparatus when the diopter is adjusted for a farsighted photographer; and, FIG. 9 is a plan view of the main components of a diopter control apparatus when the diopter is adjusted for a nearsighted photographer.

The shaft 17 is spaced from the cam plate 5 and is laterally offset away from the locus (extension thereof) of the movement of the pin 8a in a plane parallel with the plane of the cam plate 5 as shown in FIG. 8. Rotation of the lever 3 causes the eyepiece 8 to move in the optical axis direction.

The long arm 3b of the lever 3 extends to partially overlap the cam plate 5, as shown in FIG. 8. The long arm 3b is provided on the front end thereof with an inverted V-shaped projection 3d which is bent to protrude toward the cover 2 (FIG. 1). The height of the projection 3d, which constitutes a restricting mechanism, is slightly larger than the distance between the inner surface of the cover 2 and the lever 3 at the position of the shaft 17. Therefore, in an inoperative position as shown in FIG. 6, the projection 3d comes into contact with the inner surface of the cover 2 to restrict the rotational movement of the lever 3 (i.e., positioning of the eyepiece 8). Preferably, the inner surface of the cover 2 is provided with a satin finish or is knurled to increase the coefficient of friction thereof to thereby enhance the friction between the cover 2 and the projection 3d.

Figure 7:
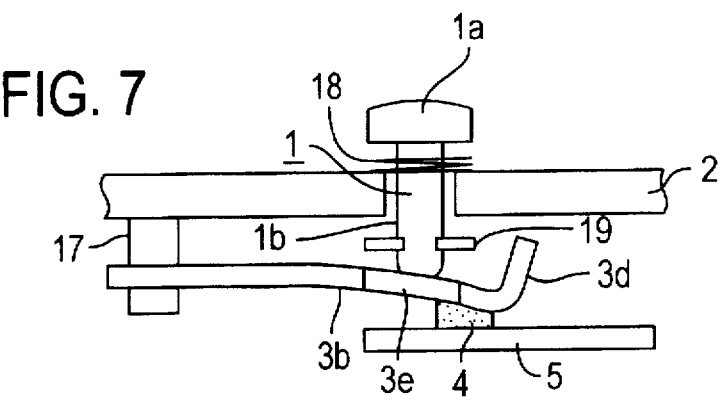
FIG. 7 is a perspective view of a switching button and its surroundings when the switching button is depressed.

The long arm 3b is provided, on the surface of the front end thereof that is located adjacent to the cam plate 5, with a cylindrical friction pad 4 made from a material having a high coefficient of friction such as rubber or sponge. The height (thickness) of the friction pad 4 is such that there is a gap between the cam plate 5 and the pad 4 in the inoperative position, as shown in FIG. 6. However, the friction pad 4 can be brought into contact with the cam plate 5 when the long arm 3b is elastically deformed toward the cam plate 5 in an operative position, as shown in FIG. 7.

Moreover, the long arm 3b is integrally provided on an intermediate portion thereof with an arched portion 3e, whose center is located on the axis of the shaft 17. The length of the arched portion 3e in the arc direction is slightly longer than the angular displacement of the lever 3.

The switching button 1, which is used as a switching means, is provided on the upper surface 30a of the camera 30 with a head portion (operating portion) 1a, as shown in FIG. 6. A shaft portion 1b slidably extends through the cover 2 and always extends through the cover 2 at a position above the arched portion 3e, regardless of the angular position of the lever 3. Consequently, the long arm 3b can be elastically deformed from the inoperative position shown in FIG. 6 to the operative position shown in FIG. 7, by a downwardly depression of the switching button 1 to thus push the arched portion 3e, wherever the lever 3 is located.

A compression spring 18 is located between the head portion 1a of the switching button 1 and the cover 2 to bias the switching button 1 towards the inoperative position, as shown in FIG. 6. To prevent the switching button from coming out of the cover 2, the shaft portion 1b is provided with a ring 19 secured to a lower end thereof inside the cover 2. The distance between the ring 19 and the bottom of the shaft portion 1b is shorter than the height (length) of the projection 3d. Consequently, in the inoperative position in which no external force is applied to the switching button 1 to depress the same, the bottom end of the shaft portion 1b does not contact with the arched portion 3e of the lever 3.

The diopter control apparatus of a zoom camera according to an aspect of the present invention operates as follows.

To zoom the variable photographing optical system 29 and the variable finder optical system upon taking a picture, the photographer rotates the zoom lever 6 in the telephoto direction T or the wide angle direction W by the thumb of his or her right hand, which holds the camera, without depressing the switching button 1. Consequently, the switch element 6aT or 6aW is turned ON in accordance with the rotation direction of the zoom lever 6. The drive circuit C then drives the motor M in the direction corresponding to the switch element 6aT or 6aW. As a result, the cam plate 5 is slid in the telephoto direction T or the wide angle direction W.

The sliding movement of the cam plate 5 causes the first and second cam grooves 5a and 5b, formed in the cam plate 5, to move so that the movable lenses L2 and L3 are moved to predetermined positions defined by the profiles of the respective cam grooves 5a and 5b to thereby carry out the zooming operation of the objective lens system 10 of the variable finder optical system. The zooming operation of the variable photographing optical system 29 is also carried out by the cam ring 25 which is rotated synchronously with the zooming operation of the objective lens system 10.

As a result, the angle of view of the variable finder optical system varies, but little or no change in the image forming position, in which a real image of an object is formed by the objective lens system, takes place. Namely, the image of an object at a standard object distance is formed on the surface of the focusing plate 12 (on which the AF object distance measuring frame F is provided). Consequently, if the eyepiece 8 is located in the reference position, a photographer having normal eyesight can correctly view the images of the object and the AF object distance measuring frame F through the eyepiece 8.

The switching button 1 is biased by the compression spring 18 to the inoperative position in which it projects most outwardly from the camera 30 during the zooming operation mentioned above. Consequently, the long arm 3b of the lever 3 is also in the inoperative position, as shown in FIG. 6. In this state, the projection 3d is in contact with the inner surface of the cover 2, so that no rotation of the lever 3 occurs. Moreover, since the pad 4 is spaced from the cam plate 5, the eyepiece 8 is immovably held, regardless of the movement of the cam plate 5.

If a nearsighted or farsighted photographer now uses the camera, it is necessary to move the eyepiece 8 in the optical axis direction in order to correct the diopter. To this end, the photographer rotates the zooming lever 6 by the thumb of his or her right hand, which holds the camera, while depressing the switching button 1 by his or her left hand. Namely, in the case of a farsighted photographer, the zooming lever 6 is rotated in the telephoto direction T; and, in the case of a nearsighted photographer, the zooming lever 6 is rotated in the wide angle direction W. As a result, the cam plate 5 is respectively slid in the telephoto direction T or the wide angle direction W, while zooming the variable finder optical system and the variable photographing optical system 29.

Figure 9:
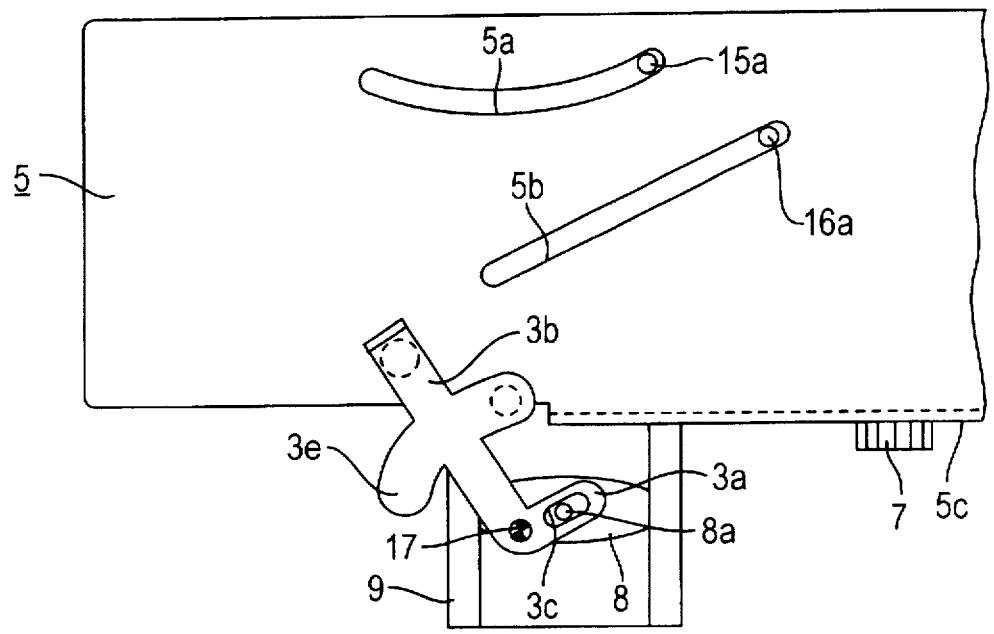

Since the switching button 1 is depressed against the force of the compression spring 18 by the photographer, the long arm 3b of the lever 3 is elastically deformed toward the cam plate 5 by the shaft portion 1b of the switching button 1, so that the friction pad 4 comes in contact with the cam plate 5, as shown in FIG. 7. Consequently, the sliding movement of the cam plate 5 causes the friction pad 4 to move together therewith due to the friction. Thus, the lever 3 is rotated as a whole. In the case of a farsighted photographer the lever 3 is rotated in the clockwise direction as shown in FIG. 8, i.e., when the cam plate is slid in the telephoto direction T. Whereas, in the case of a nearsighted photographer the lever is rotated in the counterclockwise direction as shown in FIG. 9, i.e., when the cam plate is slid in the wide angle direction W. As a result of the rotation of the lever 3, the eyepiece 8 is moved in the optical axis direction through the short arm 3a. Namely, in the case of a farsighted photographer, the eyepiece is moved toward the photographer; and in the case of a nearsighted photographer, the eyepiece is moved toward the focusing plate 12.

As mentioned above, the photographer depresses the switching button 1 and actuates the zoom lever 6 while viewing the eyepiece 8 to adjust the position of the eyepiece 8. This operation is repeated until the AF object distance measuring frame F is clearly seen. Thus, the diopter of the variable finder optical system is adjusted.

Note that since the lever 3 and the pin 8a of the eyepiece 8 are connected through the elongated hole 3c formed in the short arm 3a, no squeaking or creaking, which would be otherwise produced by the rotation of the lever 3, occurs. Moreover, since the long arm 3b, provided with the friction pad 4, is longer than the short arm 3a, the displacement of the eyepiece 8 can be reduced in comparison with the sliding movement of the cam plate 5. Consequently, a fine adjustment of the displacement of the eyepiece 8 can be effected.

In addition to the foregoing, since the portion 3e which laterally extends across the length of the long arm 3b is arc shaped with the center located on the axis of the pivot shaft 17, the switching button 1 can always depress the arched portion 3e of the lever 3 regardless of the angular position of the lever 3. Namely, the friction pad 4 can be continuously brought into contact with the cam plate 5 when the long arm 3b is elastically deformed by the switching button 1. Moreover, since the friction pad 4 is in contact with the cam plate 5 at the circular end surface of the pad, the pad 4 can be moved together with the cam plate 5 due to the frictional force while rotating relative to the cam plate 5.

After the adjustment of the diopter is completed, the switching button 1 is released and then, the zoom lever 6 is rotated to return the focal lengths of the variable photographing optical system 29 and the variable finder optical system to their initial values, so that a normal photographing operation can be established again. Thus, no accidental or unintentional movement of the eyepiece 8 takes place so long as the switching button 1 and the zoom lever 6 are not simultaneously actuated.

It is possible to provide a toggle mechanism on the switching button 1 in order to repeatedly switch the inoperative position shown in FIG. 6 and the operative position shown in FIG. 7 and retain the selected position, every time the switching button 1 is depressed. In this alternative, it is not necessary for the photographer to continue depressing the switching button 1 during the adjustment of the diopter, and hence, the photographer can effect the diopter adjustment only by his or her right hand which holds the camera.

Alternatively, it is also possible to move the pivot shaft 17 along the axis thereof by an external operation to thereby move the whole lever 3 upward or downward. In this alternative, the laterally extending arched portion 3e can be dispensed with. It is also possible to provide a gear mechanism which moves the cam plate 5 and the eyepiece 8 in association with each other, in place of the lever 3. The gear mechanism can be provided with a clutch which establishes or breaks the transmission of the power between the cam plate 5 and the eyepiece 8 in response to an external operation.

As can be understood from the above discussion, in a diopter control apparatus for a zoom camera, according to the present invention, the diopter correcting lens can be moved in the optical axis direction by actuating the switch for the motor which is driven to zoom the variable finder optical system. Consequently, a photographer can easily adjust the diopter, using a finger of his or her hand which holds the camera, without moving their eye away from the camera.

What is claimed is:

1. A diopter control apparatus in a camera having a variable finder optical system in which a zooming operation is achieved by varying a distance between at least two variable power lenses, said diopter control apparatus comprising:

a diopter correcting lens supported to move in an optical axis direction of said variable finder optical system to correct a diopter of said variable finder optical system;

a lens driving mechanism driven to move at least one of said lenses of said variable power lenses of said variable finder optical system in said optical axis direction; and a switching mechanism associated with said lens driving mechanism and said diopter correcting lens, said switching mechanism having a first state and a second state, said first state being a state in which a motive force of said lens driving mechanism is not transmitted to said diopter correcting lens, so that said variable power lenses of said variable finder optical system moves while said diopter correcting lens does not move, said second state being a state in which said motive force of said lens driving mechanism is transmitted to said diopter correcting lens, so that said variable power lenses of said variable finder optical system and said diopter correcting lens move together.

2. A diopter control apparatus according to claim 1, further comprising a variable photographing optical system whose focal length is varied in synchronization with said zooming of said variable finder optical system when a lens of said variable photographing optical system is moved in the optical axis direction by a motor.

3. A diopter control apparatus according to claim 1, wherein said variable finder optical system is a real image type finder in which a real image of an object to be photographed is formed by an objective lens system.

4. A diopter control apparatus according to claim 1, wherein said lens driving mechanism comprises a motor and a cam plate which is provided with a cam to move said at least one of said lenses of said variable finder optical system in the optical axis direction, said cam plate being moved in a direction perpendicular to the optical axis by said motor.

5. A diopter control apparatus in a camera having a variable finder optical system in which a zooming operation is achieved by varying a distance between at least two lenses, said diopter control apparatus comprising:

a diopter correcting lens which is supported to move in an optical axis direction of said variable finder optical system to correct a diopter of said variable finder optical system;

a lens driving mechanism which is driven to move at least one of said lenses of said variable finder optical system in said optical axis direction to perform said zooming operation;

a transmission mechanism which transmits a motive force of said lens driving mechanism to said diopter correcting lens to move said diopter correcting lens in the optical axis direction; and switching means for selectively switching said transmission of said motive force by said transmission mechanism to move said diopter correcting lens in accordance with an external operation, wherein said lens driving mechanism comprises a motor and a cam plate which is provided with a cam to move said at least one of said lenses of said variable finder optical system in the optical axis direction, said cam plate being moved in a direction perpendicular to the optical axis by said motor, said transmission mechanism comprising a lever rotatably supported by a pivot shaft and which is provided with a first arm extending adjacent to a surface of said cam plate and a second arm connected to said diopter correcting lens, a friction member being provided on said first arm.

6. A diopter control apparatus according to claim 5, wherein said switching means moves said first arm away from or toward said cam plate to thereby selectively bring said friction member into contact with said cam plate, so that when said friction member is brought into contact with said cam plate by said switching means, said movement of said cam plate causes said lever to rotate to thereby move said diopter correcting lens in the optical axis direction.

7. A diopter control apparatus according to claim 5, wherein said switching means depresses said first arm at a position away from said pivot shaft to elastically deform said first arm to thereby bring said friction member provided on said first arm into contact with said cam plate.

8. A diopter control apparatus according to claim 7, wherein said first arm is provided with an arched portion whose center of arc is located along an axis of said pivot shaft and which is depressed by said switching means.

9. A diopter control apparatus according to claim 8, wherein said switching means comprises a shaft portion which depresses said arched portion of said first arm, and an operating portion which is connected to one end of said shaft portion and which is located outside of said camera.

10. A diopter control apparatus according to claim 7, further comprising restricting means for restricting an angular displacement of said lever when said transmission of said movement of said cam plate to said lever is interrupted by said switching means.

11. A diopter control apparatus according to claim 1, wherein said lens driving mechanism comprises a motor and a movable member which is moved in a predetermined direction by said motor and said transmission mechanism comprises converting means for transmitting movement of said movable member to said diopter correcting lens to move said diopter correcting lens in the optical axis direction.

12. A diopter control apparatus according to claim 11, wherein said predetermined direction a direction perpendicular to the optical axis.

13. A diopter control apparatus according to claim 11, wherein said movable member comprises a plate which is moved in a direction perpendicular to the optical axis by said motor.

14. A diopter control apparatus according to claim 1, wherein said diopter correcting lens comprises an eyepiece lens of said variable finder optical system.

15. A diopter control apparatus according to claim 1, wherein said switching means comprises a switching button supported by said camera, said switching button being movable between an operative position that causes said motive force to be transmitted to said diopter correcting lens by said transmission mechanism, and an inoperative position at which said motive force is not transmitted to said diopter correcting lens by said transmission mechanism.

16. A diopter control apparatus according to claim 15, wherein said external operation comprises manual movement of said switching button to said operative position.

17. A diopter adjusting apparatus for a camera having a variable photographing optical system that is driven by a driving source to perform a zooming operation and a variable finder optical system that is driven in accordance with the zooming operation of said variable photographing optical system, said diopter adjusting apparatus comprising:

- a diopter correcting lens that corrects a diopter of said variable finder optical system; and
- a switching mechanism associated with said variable finder optical system and said diopter correcting lens, said switching mechanism being manually and selectively actuated between a first state, in which said diopter correcting lens is not driven by said driving source while said variable finder optical system is driven by said driving source, and a second state, in which said diopter correcting lens is driven together with said variable finder optical system by said driving source.

18. A diopter control apparatus according to claim 17, wherein said diopter correcting lens comprises an eyepiece lens of said variable finder optical system.

19. A camera, comprising:

- a variable finder optical system including a plurality of lenses, at least one of said lenses being driven by a driving source to vary a focal length of said variable finder optical system in accordance with operation of a zoom lever; and
- a diopter adjusting device for correcting a diopter of said variable finder optical system during a driving operation of said at least one of said lenses of said variable finder optical system, said diopter adjusting device transmitting a motive force of said driving source to move a diopter correcting lens to correct the diopter of said variable finder optical system, said diopter adjusting device comprising a switching member that is manually switchable to an operative position,
- whereby a diopter of said variable finder optical system is adjusted by said diopter adjusting device in response to manually switching said switching member to said operative position and operating said zoom lever, while said diopter adjusting device does not correct said diopter of said variable finder optical system during said driving operation when said switch member is in said inoperative position.

20. A camera according to claim 19, wherein said diopter correcting lens comprises an eyepiece lens of said variable finder optical system.

* * * * *

UNITED STATES PATENT AND TRADEMARK OFFICE
CERTIFICATE OF CORRECTION

PATENT NO. : 5,790,908
DATED : August 4, 1998
INVENTOR(S) : Norimichi MATSUDA

It is certified that error appears in the above-identified patent and that said Letters Patent is hereby corrected as shown below:

```
     At column 12, line 56 (claim 12, line 2) of
the printed patent, change "direction a" to ---
direction is a---.
```

Signed and Sealed this

Twenty-third Day of November, 1999

Attest:

Q. TODD DICKINSON

*Attesting Officer*       *Acting Commissioner of Patents and Trademarks*